April 17, 1962 H. V. ELLIOTT ET AL 3,030,459
CIRCUIT CONTROLLER
Filed July 30, 1959 4 Sheets-Sheet 1

INVENTORS
Harold V. Elliott
BY Charles E. Bates
Robert E. Johnson
C. R. Meland
Their Attorney

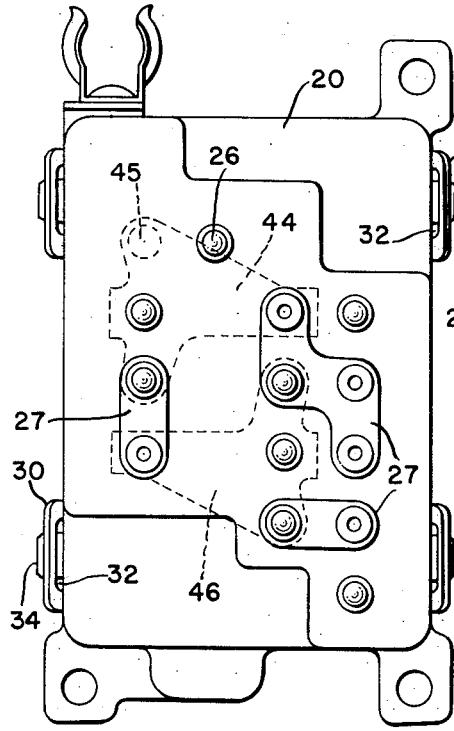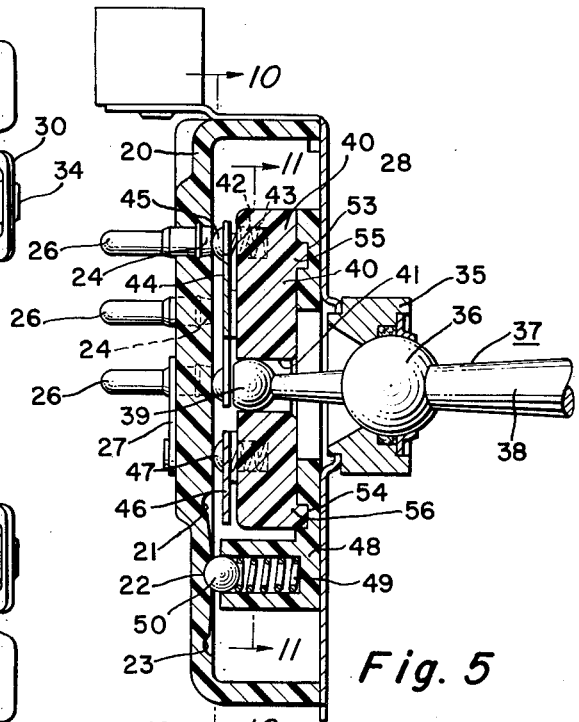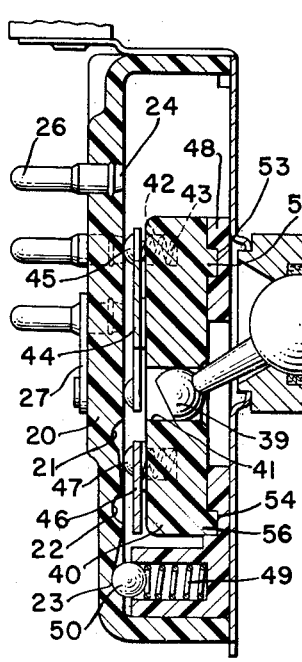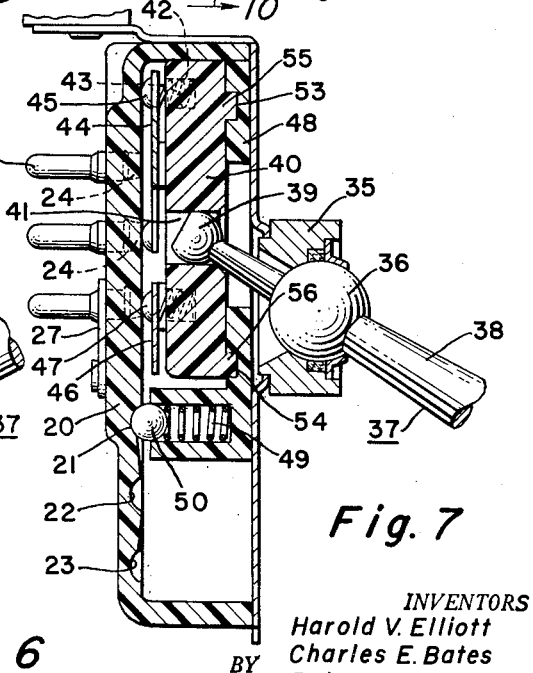
Fig. 4
Fig. 5
Fig. 6
Fig. 7
INVENTORS
Harold V. Elliott
Charles E. Bates
Robert E. Johnson
BY C. R. Meland
Their Attorney April 17, 1962    H. V. ELLIOTT ET AL    3,030,459
CIRCUIT CONTROLLER Filed July 30, 1959    4 Sheets-Sheet 3

INVENTORS
Harold V. Elliott
Charles E. Bates
Robert E. Johnson
BY
C. R. Meland
Their Attorney

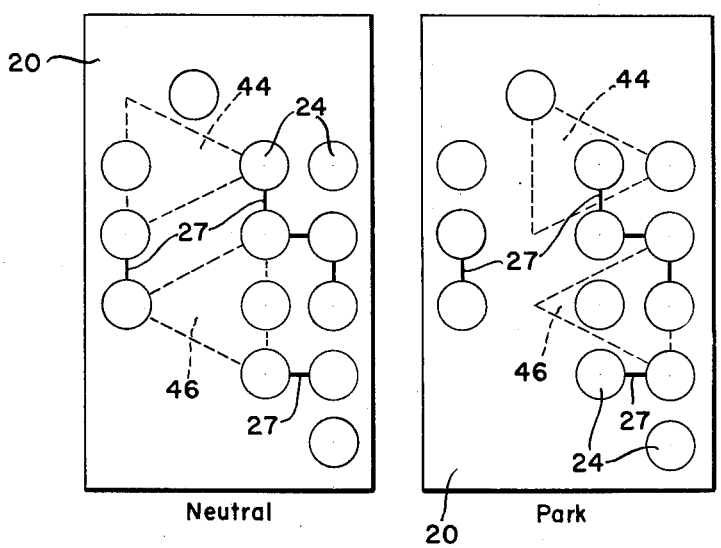
Fig. 12 Neutral  Fig. 13 Park
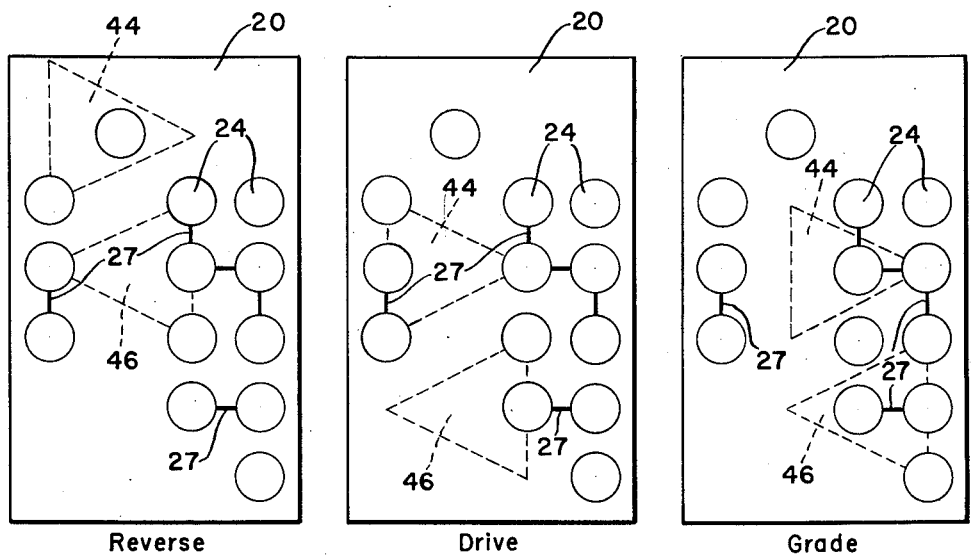
Fig. 14 Reverse  Fig. 15 Drive  Fig. 16 Grade
INVENTORS
Harold V. Elliott
Charles E. Bates
Robert E. Johnson
BY C. R. Meland
Their Attorney United States Patent Office 3,030,459
Patented Apr. 17, 1962

3,030,459
CIRCUIT CONTROLLER
Harold V. Elliott, Charles E. Bates, and Robert E. Johnson, Anderson, Ind., assignors to General Motors Corporation, Detroit, Mich., a corporation of Delaware
Filed July 30, 1959, Ser. No. 830,498
8 Claims. (Cl. 200—6)

This invention relates to a circuit controller for controlling a plurality of electrical circuits and more particularly to a circuit controller that includes means confining the switching action to a predetermined pattern.

One of the objects of this invention is to provide a circuit controller or switch including a plurality of fixed contacts and a movable contact which has its path of movement confined to a predetermined pattern.

Another object of this invention is to provide an electric switch that includes a plurality of fixed contacts which are engaged by one or more movable contacts and wherein the movable contacts are supported by a member that has confined movement in a first path and confined movement along a path located at an angle to said first path.

Still another object of this invention is to provide an electric switch or circuit controller wherein the movement of the movable contact of the switch is controlled by a pair of slide members which are movable together by a manual actuator and which are movable relative to each other under control of the same manual actuator.

Further objects and advantages of the present invention will be apparent from the following description, reference being had to the accompanying drawing wherein preferred embodiments of the invention are clearly shown.

In the drawings:

FIGURE 4 is a rear view of the switch illustrated in FIGURE 1.

FIGURE 5 is a sectional view taken along line 5—5 of FIGURE 1.

FIGURE 6 is a view similar to FIGURE 5 but showing the switch shifted to another position.

FIGURE 7 is a view similar to FIGURES 5 and 6 but showing the switch shifted to still another position.

FIGURES 12 through 16 are charts illustrating the positions of the fixed contacts and movable contacts of the switch of this invention in various shifted positions of the movable contacts.

Figures 1, 2:
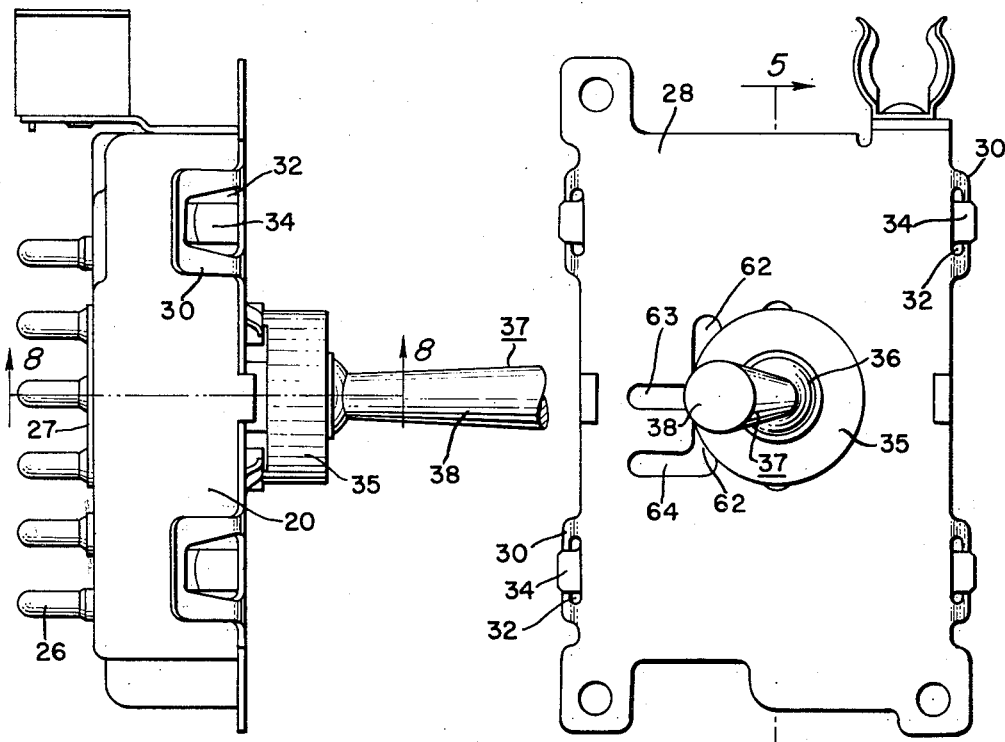
FIGURE 1 is a top view of an electric switch made in accordance with this invention.
FIGURE 2 is a side view of the switch illustrated in FIGURE 1.
Figure 3:
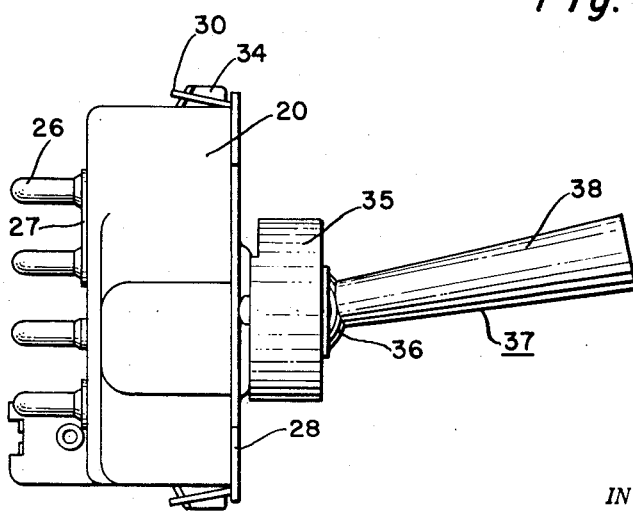
FIGURE 3 is an end view of the switch illustrated in FIGURES 1 and 2.

The switch to be described has particular utility in controlling a motor vehicle automatic transmission although it will be readily apparent that its use is not so limited.

Referring now to the drawings, and more particularly to FIGURES 1 through 5, it is seen that the switch of this invention includes a base member designated by reference numeral 20 and formed of a suitable insulating material. The base member 20 is generally box-shaped, as is clearly apparent from the drawings, and has a plurality of detent recesses designated by reference numerals 21, 22 and 23. The lower wall of the base member 20 carries a plurality of electrical contacts designated by reference numeral 24. It is seen that certain of these contacts are connected with terminal pins designated by reference numeral 26 which are adapted to be fitted within a female terminal connector. It can be seen from the charts of FIGURES 12 to 16 that there are 13 contacts supported by the base member 20 and these contacts are positioned on the base member as indicated by the charts of FIGURES 12 through 16. Certain of the electrical contacts are connected by terminal straps designated by reference numeral 27 as is apparent from FIGURE 4 and from the charts illustrated in FIGURES 12 through 16.

The base member 20 is fitted with a sheet metal cover designated by reference numeral 28 and having extensions 30 formed with openings 32 that snap over projecting portions 34 of the base member. In this manner, the cover 28 is held in fixed relationship with the base member 20. The cover member 28 carries a ball socket member designated by reference numeral 35 having an internal spherical seat that cooperates with the spherical portion 36 of a manually operable switch actuator designated in its entirety by reference numeral 37. The switch actuator 37 has a handle portion 38 which is grasped by the operator of the switch and has a portion 39 which shifts a movable slide member designated in its entirety by reference numeral 40. It is seen that the portion 39 of the manual actuator 37 fits within an opening 41 formed in the slide member 40.

Figure 10:
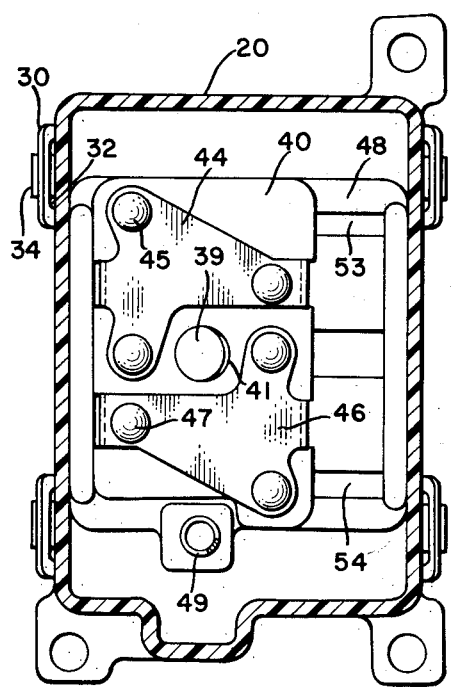
FIGURE 10 is a sectional view taken along line 10—10 of FIGURE 5.

The slide member 40 is formed of any suitable insulating material and is provided with a plurality of openings 42 which receive springs designated by reference numeral 43. The springs 43 urge respectively contactors 44 and 46 into engagement with the fixed contacts 24 located along the base 20. The contactor 44 has three projections 45, whereas the contactor 46 carries three projections designated by reference numeral 47. The contactors 44 and 46 are triangular in shape as is better illustrated in FIGURES 4 and 10 and the contact projections 45 and 47 serve to make electrical contact with the fixed contacts 24. It will be appreciated that the contactors 44 and 46 are urged into tight engagement with the base 20 by the springs 43.

A second slide member designated by reference numeral 48 and formed of insulating material is provided which has one wall thereof located in engagement with the cover member 28. The slide member 48 has an opening which receives a spring 49 and a ball 50. It can be seen that the ball 50 snaps into the various detent recesses 21, 22 and 23 when the slide member 48 is shifted. The slide member 48 has a pair of transversely extending grooves designated by reference numerals 53 and 54. Fitted within the grooves 53 and 54 are the projecting portions or ridges 55 and 56 on slide member 40. The grooves 53 and 54 of slide member 48 are recessed at 57 and 58 and these recesses cooperate with detent portions (not shown) that project from ridges 55 and 56. With this arrangement the detent portions that project from ridges 55 and 56 snap into the recessed portions 57 and 58 of the grooves 53 and 54 during slidable movement of the slide member 40 relative to the slide member 48. The recesses 57 and 58 are preferably triangular in cross-section as are the detent projections that extend from projecting portions 55 and 56.

Figure 8:
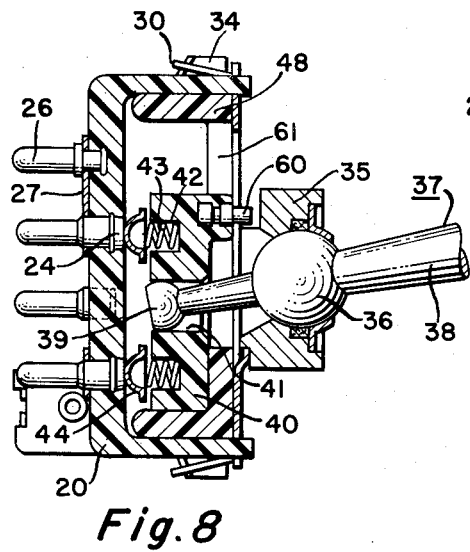
FIGURE 8 is a sectional view taken along line 8—8 of FIGURE 2.
Figure 9:
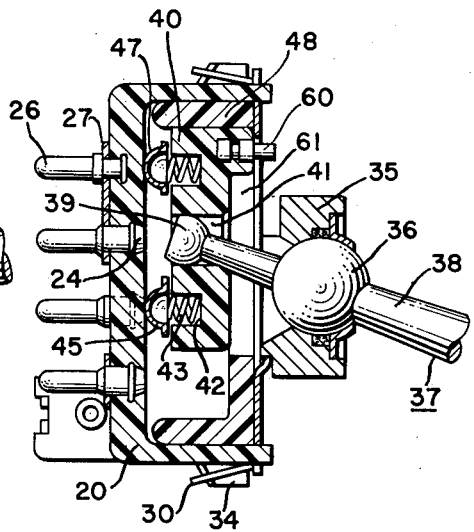
FIGURE 9 is a view similar to FIGURE 8 but illustrating the switch shifted to another position.

The slide member 40, as is better illustrated in FIGURES 8 and 9, carries a pin designated by reference numeral 60. This pin passes through an opening 61 formed in the slide member 48 and passes into slots 62, 63 and 64 formed in the sheet metal cover member 28 of the switch. It can be seen from FIGURE 1 that the slot 62 extends lengthwise of the switch while the slots 63 and 64 communicate with the slot 62, but are located at right angles to the slot 62. With this arrangement, the slide member 40 has its movement confined to a predetermined path as dictated by the movement of pin 60 within the slots 62, 63 and 64.

As has been noted hereinbefore, the switch of this invention has particular utility in controlling the automatic transmission of a motor vehicle that will be shifted to a "neutral" position, a "park" position, a "reverse" position, a "drive" position, and a "grade retard" position. Thus, in the "neutral" position of the switch, which is illustrated in FIGURES 1 through 5, the actuating handle takes the position illustrated and the contactors 44 and 46 take the positions illustrated in FIGURE 12. In this position the ball detent of slide member 48 is located within the recess 22 of the base member 20. If it is desired to shift the switch to the "reverse" position, the handle portion 38 is grasped and moved downwardly to the position illustrated in FIGURE 7. During this movement of the handle 38 the slide member 40 is shifted by the handle, whereas the slide member 48 is shifted through the ridges 55 and 56. During the movement of the switch parts from the FIGURE 5 to the FIGURE 7 position, the pin 60 slides within the slot 62 so that there is no impediment to this movement. When the switch reaches the reverse position, the contactors 44 and 46 will be in a position relative to the fixed contacts, as is illustrated in FIGURE 14.

If it is desired to shift the electric switch to the drive position illustrated in FIGURE 6, the handle 38 is grasped and moved upwardly to the position illustrated in FIGURE 6. This will move the slide member 40 and this slide member will, in turn, move slide member 48 to the position illustrated in FIGURE 6. In this position the detent ball 50 snaps into detent recess 23 and the pin 60 continues to move within the slot 62. When the slide members 40 and 48 are in the position of FIGURE 6, the contacts 44 and 46 take the positions illustrated in the chart of FIGURE 15.

It can be seen that in shifting between "neutral," "reverse" and "drive" positions the pin 60 moves without impediment within the slot 62 and that the manual actuator 37 drives the slide member 40, with the slide member 40, in turn, driving the slide member 48.

When the switch is shifted to the "reverse" position, the pin 60 is positioned within the portion of slot 62 that is not in alignment with either slots 63 or 64. This prevents the switch parts from being moved in any direction except along slot 62 when the switch is shifted to the "reverse" position.

When the switch is in the "neutral" position, the pin 60 is positioned within slot 62 but is also in alignment with the slot 63 so that the slide 40 may be moved with respect to slide 48 to shift the switch to a "park" position. The "park" position of the switch is thus illustrated in FIGURE 9 wherein the slide member 40 has been shifted relative to slide member 48, and with the switch in the "park" position, the pin 60 takes a final position in the end of slot 63. When the pin 60 is positioned within the slot 63, it is seen that the switch has its movement confined to the direction of slot 63.

When the switch is in the "park" position the contactors 44 and 46 take the position illustrated in FIGURE 13 relative to the fixed contacts of the switch.

Figure 11:
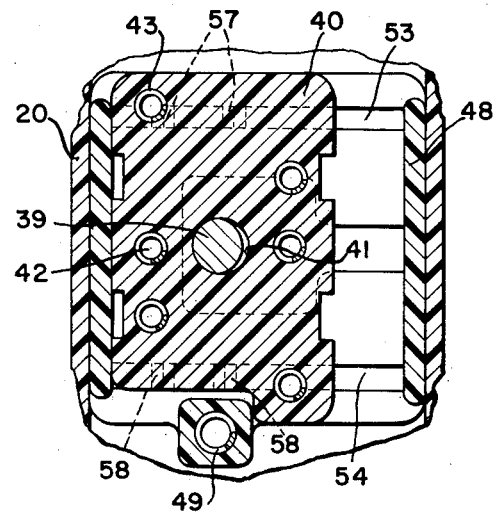
FIGURE 11 is a sectional view taken along the line 11—11 of FIGURE 5.

When the switch has been shifted to the "drive" position the pin 60 is located within slot 62 and in direct alignment with slot 64 so that it may be shifted into this slot. When the handle 37 is moved to shift the slide 40 and the pin into the slot 64 the switch is shifted to a position wherein the contactors 44 and 46 are located as illustrated in FIGURE 16. It will be appreciated that the switch slide 40 in this case is shifted relative to the switch slide 48 and will be moved in a direction dictated by the slot 64. When the slide 40 is moved relative to slide 48 the triangular projections extending from ridge portions 55 and 56 of the slide 40 snap into the triangular recesses 57 and 58 formed in grooves 53 and 54. The "neutral" position of the slide 40 is illustrated in FIGURES 8 and 11 whereas the park position of the slide 40 is illustrated in FIGURE 9.

In summary it can be seen that the slidable member 40 is driven or moved in two directions by the actuating handle 38 which has universal movement within the ball socket member 34. When the handle 37 is moved between the positions illustrated in FIGURES 5, 6 and 7, the slide 40 is reciprocated to, in turn, drive the slide member 48 and the pin on slide member 40 reciprocates within the slot 62. When the actuating handle is in a position such that the pin 60 is in alignment with slot 63, the slide may be shifted at right angles to its movement, illustrated in FIGURES 5, 6 and 7, to shift the switch to a position wherein the contactors 44 and 46 are positioned as illustrated in FIGURE 13. When the pin 60 on slide 40 is in alignment with slot 64, the slide 40 may be again shifted relative to slide 48 to shift the switch to the "grade retard" position illustrated in FIGURE 16. It can be seen from the foregoing that the slides 40 and 48 move together during the movement of the slides illustrated in FIGURES 5, 6 and 7, and that the members are detented during this movement by the ball detent 50. On the other hand, the slide 40 may at times be moved relative to the slide 48 and in this case the slide 40 is detented relative to the slide 48 by the triangular projections which snap into recesses 57 and 58 formed respectively in grooves 53 and 54. With the arrangement just described the switch in most cases must go through the "neutral" position before the switch can be shifted between two given positions. Thus, if the pin 60 is in the top end of slot 62 illustrated in FIGURE 1, the switch can only be shifted back to the "neutral" position. When the pin 60 is in alignment with slot 64 switching may occur between "drive" positions and "grade retard" positions without goinng through the neutral position.

While the embodiments of the invention as herein disclosed constitute preferred forms, it is to be understood that other forms might be adopted.

What is claimed is as follows:

1. A circuit controller comprising, a base member carrying a plurality of fixed electrical contacts, a slide member carrying an electrical contact that is engageable with said fixed contacts, manually operable means mounted for universal movement for shifting said slide member, a cover member secured to said base member having a slot of predetermined configuration, a pin extending from said slide member and movable within said slot for confining the movement of said slide member to a predetermined path and means maintaining said pin within said slot at all positions of said slide member.

2. A circuit controller comprising, a base member formed of insulating material carrying a plurality of fixed electrical contacts, a first slide member formed of insulating material, a second slide member formed of insulating material, contact means carried by one of said slide members for engagement with said fixed contacts, manually operable means for moving one of said slide members, first detent means connected with one of said slide members and cooperating with said base member for holding said slide member in one of a plurality of predetermined positions, means connecting said slide members for movement together when said manually operable means is shifted in one direction and for permitting relative movement of said slide members when said manually operable means is shifted in another direction, and second detent means for maintaining one of said slide members in a predetermined position relative to the other slide member after one of said slide members has been shifted relative to the other slide member.

3. A circuit controller comprising, a base member formed of insulating material carrying a plurality of electrical contacts, a contact carrier member carrying an electrical contact that is engageable with said fixed contact, a cover member secured to said base member, manually operable means mounted for universal movement with respect to said cover member and engaging said contact carrier member, a first slot in said cover member extending in a first direction, a second slot in said cover member communicating with said first slot and extending at an angle to said first slot, and means carried by said contact carrier member positioned within said slots at all positions of said contact carrier member whereby the movement of said contact carrier member is confined to a predetermined path.

4. A circuit controller comprising, a base member formed of insulating material, a plurality of fixed electrical contacts supported by said base member, a first slide member carrying an electrical contact that is engageable with said fixed contacts, a second slide member having a pair of grooves, means extending from said first slide member and fitting within said grooves whereby said slide members move together when said first slide member is moved in one direction and said slide members move relative to each other when said first slide member is moved in another direction, detent means carried by said second slide member and engageable with recesses formed in said base member, a cover plate attached to said base member having a slot of predetermined configuration, guide means extending from said first slide member into said slot, means preventing removal of said guide means from said slot, and manually operable means for shifting said first slide member.

5. A circuit controller comprising, a base member carrying a plurality of fixed electrical contacts, a slide member carrying an electrical contact that is engageable with said fixed contacts, a cover member secured to said base member, manually operable means supported by said cover member having universal movement and engaging said slide member for moving the same, a first slot in said cover member extending in a first direction, a second slot in said cover member communicating with said first slot and located substantially at right angles to said first slot, and means extending from said slide member and positioned within said slots whereby said slide member has its movement confined to a predetermined path when said manually operable means is shifted.

6. A circuit controller comprising, a base member carrying a plurality of fixed electrical contacts, a first slide member having a pair of projecting ridges carrying an electrical contact that is engageable with said fixed contacts, a second slide member having a pair of grooves which receive the extending ridge portions of said first slide member, detent means carried by said second slide member and engageable with recesses formed in said base member, a cover member secured to said base member having a slot of predetermined configuration, manually operable means supported by said cover member having universal movement, said manually operable means being connected with said first slide member for shifting the same, and means extending from said first slide member into said slot whereby the movement of said first slide member is confined to a predetermined path when said manually operable means is shifted.

7. A circuit controller comprising, a base member carrying at least one fixed contact, a guide member having a slot of predetermined configuration, means maintaining said guide member fixed with respect to said base member, an actuating lever mounted for universal movement with respect to said guide member, a contact carrier carrying at least one contact that is engageable with said fixed contact, said contact carrier being connected with said actuating lever, pin means extending from said contact carrier into said slot for guiding the movement of said contact carrier, and means for maintaining said pin means in said slot when said constant carrier is shifted by said actuating lever.

8. A circuit controller comprising, a base member formed of insulating material, a plurality of fixed electrical contacts supported by said base member, a first slide member carrying an electrical contact that is engageable with said fixed contacts, a second slide member having at least one groove, means extending from said first slide member and fitting within said groove whereby said slide members move together when said first slide member is moved in one direction and said slide members move relative to each other when said first slide member is moved in another direction, a cover plate attached to said base member having a slot of predetermined configuration, a pin member extending from said first slide member and passing through an opening in said second slide member into said slot, and manually operable means mounted in universal movement for shifting said first slide member.

References Cited in the file of this patent
UNITED STATES PATENTS

| | | |
|---|---|---|
| 1,218,059 | Cope | Mar. 6, 1917 |
| 1,549,211 | Palevich | Aug. 11, 1925 |
| 1,709,068 | Forseille | Apr. 16, 1929 |
| 1,850,769 | Porsche | Mar. 22, 1932 |
| 2,589,025 | Phelps | Mar. 11, 1952 |
| 2,604,560 | Dibelka | July 22, 1952 |
| 2,777,025 | Bertaud | Jan. 8, 1957 |
| 2,890,298 | Bullard | June 9, 1959 |